(12) United States Patent
Yembari et al.

(10) Patent No.: US 12,184,657 B1
(45) Date of Patent: Dec. 31, 2024

(54) SYSTEMS AND METHODS FOR AUTOMATING ONBOARDING WORKFLOWS

(71) Applicant: ZLURI TECHNOLOGIES PRIVATE LIMITED, Hyderabad (IN)

(72) Inventors: Chaithanya Yembari, Hyderabad (IN); Sethu Meenakshisundaram, Hyderabad (IN); Ritish Reddy, Hyderabad (IN); Shivam Verma, Hyderabad (IN); Paritosh Lokhande, Hyderabad (IN); Yatharth Singh, Hyderabad (IN)

(73) Assignee: ZLURI TECHNOLOGIES PRIVATE LIMITED, Hyderabad (IN)

( * ) Notice: Subject to any disclaimer, the term of this patent is extended or adjusted under 35 U.S.C. 154(b) by 225 days.

(21) Appl. No.: 18/082,363

(22) Filed: Dec. 15, 2022

(30) Foreign Application Priority Data

Oct. 19, 2022 (IN) .............................. 202241059874

(51) Int. Cl.
*H04L 9/40* (2022.01)
*G06N 3/02* (2006.01)
*G06Q 10/105* (2023.01)

(52) U.S. Cl.
CPC ............ *H04L 63/102* (2013.01); *G06N 3/02* (2013.01); *H04L 63/0815* (2013.01); *G06Q 10/105* (2013.01)

(58) Field of Classification Search
CPC .. H04L 63/102; H04L 63/0815; G06Q 10/105
See application file for complete search history.

(56) References Cited

U.S. PATENT DOCUMENTS

| | | | | |
|---|---|---|---|---|
| 9,075,508 B1* | 7/2015 | Cronin | ................... | G06F 9/451 |
| 9,454,576 B1* | 9/2016 | Kapoor | ............ | G06F 16/24564 |
| 9,514,488 B2* | 12/2016 | Mehta | ............... | G06Q 30/0282 |
| 9,674,699 B2* | 6/2017 | Kanov | ............... | H04W 12/069 |
| 9,734,246 B1* | 8/2017 | Lewis | ............... | G06F 16/24578 |
| 9,754,016 B1* | 9/2017 | Bozarth | ........... | G06F 16/90332 |
| 10,129,260 B1* | 11/2018 | Statica | ............... | H04L 63/1466 |
| 10,785,331 B2 | 9/2020 | Bodman et al. | | |
| 10,885,444 B2* | 1/2021 | Biswas | ............ | G06F 16/24578 |
| 11,416,801 B2* | 8/2022 | Biswas | ........... | G06Q 10/06395 |

(Continued)

FOREIGN PATENT DOCUMENTS

CN 106649705 B 6/2021

OTHER PUBLICATIONS

Torii SaaS onboarding & offboarding, BetterCloud, https://www.toriihq.com/saas-onboarding-offboardinght.

*Primary Examiner* — Jason Chiang
(74) *Attorney, Agent, or Firm* — Shumaker, Loop & Kendrick, LLP

(57) ABSTRACT

A system and method for recommending applications for employee onboarding. An employee's department and designation are identified and based on that a unique recommendation algorithm suggests most relevant applications for use. Additionally, the onboarding solution provides a levelling framework in which the applications are added automatically for user access, further the access to specific resources in the organization such as groups, licenses, roles etc. is provided. Furthermore, the resource management for employees is done such as access to shared folders, projects, dashboards, workspaces etc. is provided.

20 Claims, 8 Drawing Sheets

(56) References Cited

U.S. PATENT DOCUMENTS

| | | | |
|---|---|---|---|
| 2005/0097547 A1* | 5/2005 | Ramachandran | G06F 8/61 717/176 |
| 2005/0125281 A1* | 6/2005 | Henrickson | G06Q 30/02 705/7.29 |
| 2006/0129652 A1* | 6/2006 | Petrovskaya | G06F 9/46 709/208 |
| 2008/0052706 A1* | 2/2008 | Isaacson | G06F 8/63 717/174 |
| 2010/0017505 A1* | 1/2010 | Kamada | G06F 8/60 709/221 |
| 2010/0250337 A1* | 9/2010 | Kassaei | G06Q 30/0631 705/70 |
| 2010/0325122 A1* | 12/2010 | Yassin | G06F 16/9535 707/693 |
| 2011/0028138 A1* | 2/2011 | Davies-Moore | G06F 3/04817 455/418 |
| 2013/0124557 A1 | 5/2013 | Goode et al. | |
| 2013/0159134 A1* | 6/2013 | Chervirala | G06Q 30/02 705/26.7 |
| 2014/0019958 A1* | 1/2014 | Sherman | G06F 8/61 717/178 |
| 2014/0201681 A1* | 7/2014 | Mahaffey | H04M 1/72454 715/846 |
| 2014/0207793 A1* | 7/2014 | Liu | G06Q 50/01 707/748 |
| 2014/0366150 A1* | 12/2014 | Fang | G06F 21/105 726/26 |
| 2015/0095905 A1* | 4/2015 | Chakrabarti | G06Q 30/0241 717/178 |
| 2015/0234645 A1* | 8/2015 | Ramachandran | G06F 9/445 707/766 |
| 2015/0248281 A1* | 9/2015 | Zamir | G06F 8/63 717/171 |
| 2015/0347488 A1* | 12/2015 | Peters | G06F 3/0482 707/751 |
| 2016/0353142 A1* | 12/2016 | O'Malley | H04N 21/478 |
| 2016/0357774 A1* | 12/2016 | Gauci | G06F 17/18 |
| 2017/0359697 A1* | 12/2017 | Bhatti | G01S 5/14 |
| 2019/0050490 A1* | 2/2019 | Kuhne | G06F 3/0482 |
| 2020/0380003 A1* | 12/2020 | Abbasi Moghaddam | H04M 1/72472 |
| 2021/0149668 A1* | 5/2021 | Gupta | G06F 9/547 |
| 2021/0365806 A1* | 11/2021 | Sumanth | G06N 20/00 |
| 2022/0045959 A1* | 2/2022 | Chauhan | H04L 43/0894 |
| 2022/0058602 A1* | 2/2022 | Krajewski | H04M 15/00 |
| 2022/0114598 A1* | 4/2022 | Perkna | G06Q 30/01 |
| 2022/0253722 A1* | 8/2022 | Wu | G06Q 30/0631 |
| 2022/0309412 A1* | 9/2022 | Tomaselli | H04L 63/08 |
| 2022/0385705 A1* | 12/2022 | Piao | H04L 67/306 |
| 2022/0414403 A1* | 12/2022 | Hlavac | G06F 18/22 |
| 2023/0009348 A1* | 1/2023 | Mitra | G06F 16/285 |

* cited by examiner

SYSTEMS AND METHODS FOR AUTOMATING ONBOARDING WORKFLOWS

PRIORITY INFORMATION

The present application claims priority from an Indian patent application no. 202241059874 dated 19 Oct. 2022 any other application.

TECHNICAL FIELD

The present subject matter described herein, in general, relates to a SaaS management platform for automatically recommending applications for onboarding of an employee.

BACKGROUND

With the proliferation of applications or software used in any company these days, the onboarding of a new employee in an organization has become a challenging task. This is due to the fact that onboarding an employee involves installation of various applications or software to perform day to day tasks, but this cannot happen without a chain of approvals for every application installation. The approval procedure varies from organization to organization and generally there is no uniform structure in place to follow. Particularly the current system/methods involve multiple stake holders from different departments across the organization to provide their consent or approval for installation of any specific application on an employee's system/PC. A typical situation is when a new employee joins an organization, he/she needs specific applications in order to carry out the day to day operations. Especially, when a particular application or a software is a paid or licensed application the employee has to follow a tedious approval process to get the approvals from respective owners of the applications or cost centre managers, not to mention the waiting time involved at each step of the process. Additionally, this process also requires an IT admin or support stuff for installing the applications. All this leads to an inefficiency in the system due to an unstructured and complex onboarding procedure.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for unique recommendation algorithm for onboarding of an employee via a SaaS management platform. This summary is not intended to identify essential features of the claimed subject matter nor is it intended for use in determining or limiting the scope of the claimed subject matter.

In one implementation, a method for onboarding workflows based on a unique recommendation algorithm disclosed in the invention. The method provides unique recommendations when an employee is onboarded to an organization. Application data related to multiple applications is received from disparate sources, wherein the disparate sources include at least single sign on (SSO) integration, application integration, expense log integration, browser extension and desktop agent. Subsequently, one or more insights on application usage by employees of an organization are extracted, for each of the multiple applications from the application data. A request for onboarding a new employee is received and a designation and a department of the new employee is identified. A first list of applications used by other employees in an organization, belonging to the department of the employee based on the application usage data is determined. Additionally, a second list of applications used by other employees in the organization, having a designation similar to the designation of the new employee based on the application usage data is determined. Further, a union operation on the first and the second list of applications is performed to retrieve a unique list of applications. From the unique list of applications, a set of application are fetched based on at least one of the one or more insights and the set of applications are recommended for onboarding of the new employee.

In one implementation, a system for onboarding workflows based on a unique recommendation algorithm disclosed in the invention. The system is configured to automatically identify a unique list of applications for onboarding an employee to an organization. The system includes a memory and a processor coupled to the memory, wherein the processor is configured to execute instructions stored in the memory. The instructions are executed by the processor to receive application data related to multiple applications from disparate sources, wherein the disparate sources include at least single sign on (SSO) integration, application integration, expense log integration, browser extension and desktop agent. Subsequently, one or more insights on application usage by employees of an organization are extracted for each of the multiple applications from the application data. A request for onboarding a new employee is received and a designation and a department of the new employee is identified. A first list of applications used by other employees in an organization belonging to the department of the employee based on the application usage data is determined. Additionally, a second list of applications used by other employees in the organization having a designation similar to the designation of the new employee based on the application usage data is determined. Further, a union operation on the first and the second list of applications is performed to retrieve a unique list of applications. From the unique list of applications, a set of application are fetched based on at least one of the one or more insights and the set of applications are recommended for onboarding of the new employee. In one aspect, the aforementioned method for onboarding workflows based on a unique recommendation algorithm may be performed by a processor using programmed instructions stored in a memory.

In another implementation, a non-transitory computer program product embodying a program executable in a computing device is disclosed for onboarding workflows based on a unique recommendation algorithm. The computer program product stores instructions for receiving application data relating to multiple applications from disparate sources, wherein the disparate sources include at least single sign on (SSO) integration, application integration, expense log integration, browser extension and desktop agent. Subsequently, one or more insights on application usage by employees of an organization are extracted for each of the multiple applications from the application data. A request for onboarding a new employee is received and a designation and a department of the new employee is identified. A first list of applications used by other employees in an organization belonging to the department of the employee based on the application usage data is determined. Additionally, a second list of applications used by other employees in the organization having a designation similar to the designation of the employee based on the application usage data is determined. Further a union operation on the first and the second list of applications to retrieve a unique list of applications is performed. From the unique list of applications, a set of application are fetched based on usage pattern of applications and the set of applications are ordered based on the number of users of each application. Finally, the set of applications are recommended for onboarding of the employee.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for unique recommendation for onboarding workflows disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
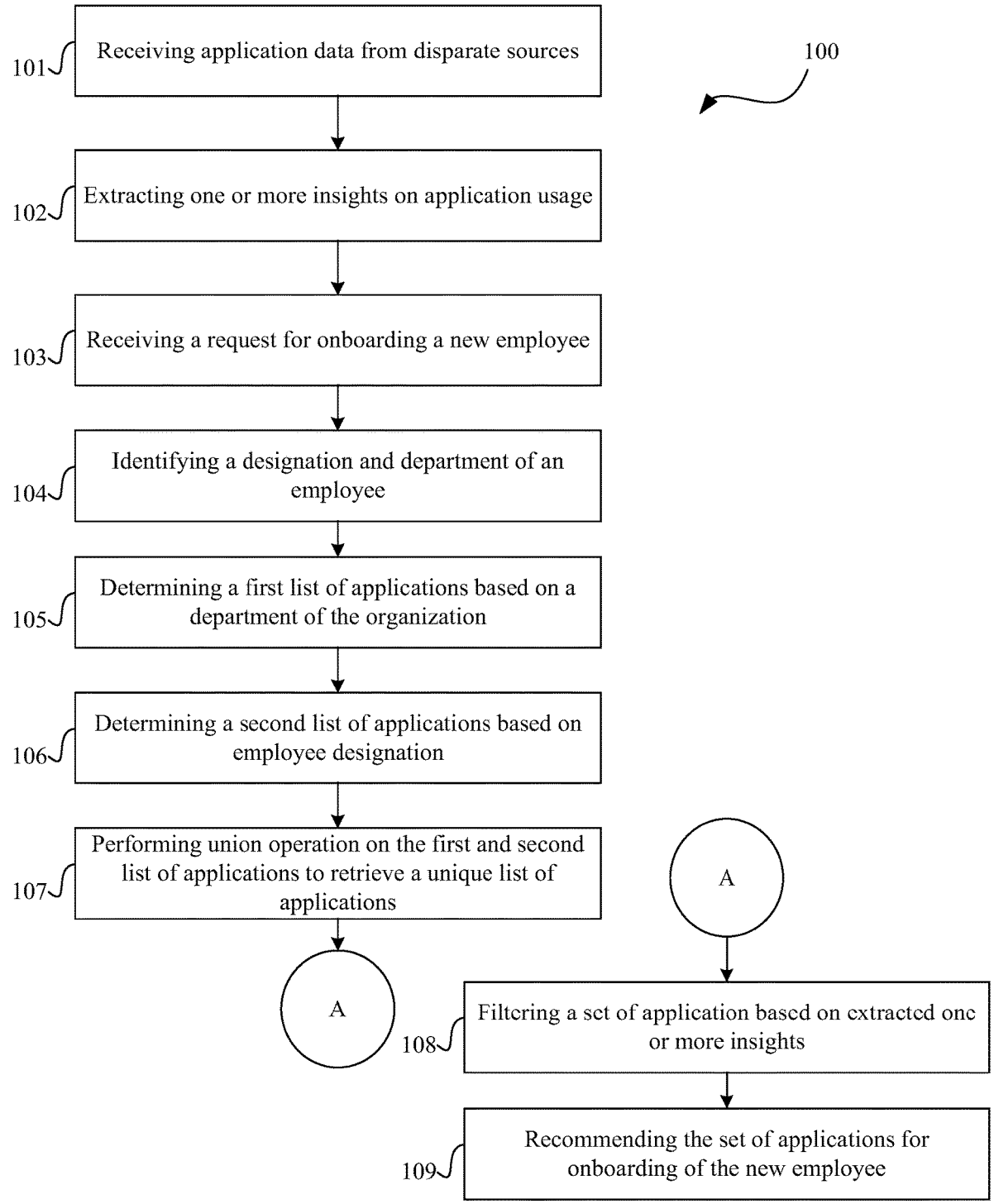
FIG. 1 illustrates a method for unique recommendation for onboarding workflows, in accordance with an embodiment of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "extracting" "determining," "identifying," "performing," "fetching," "ordering," "recommending," and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for automatically recommending applications that may be needed for use for a new employee. During the onboarding process an employee's designation and department in the organization is obtained by the system and the system automatically recommends the most relevant applications for the employee.

Additionally, the method and system provide a levelling framework wherein corresponding to each application, different level of actions may be performed automatically. For example, the system may automatically provide one or more actions to an IT admit such as add the new employee to an application, provide access control to various resources in the organization and perform resource management. For instance, if a new employee joined in a 'Sales' team with a designation of 'Sales Executive' and the recommended application included 'Slack®' application. The Slack® application is a messaging platform used mainly in offices for instant messaging and official communication. The automatic actions retrieved for this application would be adding Slack® application to the employees account (Level 1), adding employee to multiple channels on Slack® application relevant to his role and group he joined (Level 2) and subsequently allowing access to various resources related to application/projects he is going to work with (Level 3). In this way corresponding to recommended applications a levelling framework comes into action by recommending actions automatically. In another embodiment, the automatic recommendations may be provided directly to the employee or any other staff/personnel with admin rights.

Referring now to FIG. 1, a method 100 for onboarding workflows based on a unique recommendation algorithm is shown, in accordance with an embodiment of the present subject matter. The method 100 may be described in the general context of computer executable instructions. Generally, computer executable instructions can include routines, programs, objects, components, data structures, procedures, modules, functions, etc., that perform particular functions or implement particular abstract data types.

The method 100 for onboarding workflows based on a unique recommendation algorithm may be implemented in any suitable hardware, software, firmware, or combination thereof. However, for ease of explanation, in the embodiments described below, the method 100 may be considered to be implemented in the system 500 of FIG. 5.

Referring back to FIG. 1, a method 100 for automatically recommending applications for onboarding of an employee is disclosed. Firstly, at step 101 a processor receives application data related to multiple applications. The multiple applications may include one or more tools or software used for performing day to day tasks of an employee in an organization. For example, applications such as Google's G Suite®, Slack®, Era®, Zoom®, Salesforce® etc. These applications also popularly known as Software as a Service (SaaS) applications or on demand software. Users can connect to and use these cloud-based applications online as they are centrally hosted. The application data is received from variety of sources and in a huge volume. The sources may include different integration platforms such as single sign on (SSO) integration platform, application integration platform and expense log integration platform. The SSO integration generally provides information related to user, email id, access rights, application and log in details etc., via an SSO provider for example Google Workspace®, Microsoft Azure® AD, OKTA® etc. Similarly, the application integration may provide usage details of any particular application, the different applications that are used/subscribed by a particular user, a track record of log in times, license information about application etc. The expense log integration for example may provide information related to different financial transactions done in the organization through expense or finance management systems such as Quickbook®, NetSuite® etc. For example, this expense log integration captures transaction details related to an application such as amount and date on which transaction was done. Further, this information is mapped with the corresponding application against which the particular transaction was done. In this manner, these integrations help in extracting insights about usage of multiple applications at step 102.

The different integration platforms used for obtaining application usage insights operate with different applications via APIs. These APIs operate in such a way that it acts as a gateway between a web server and a SaaS application user to application usage insights.

For example, a single sign on (SSO) which is a session and user authentication service lets users utilize one set of login credentials to access multiple applications. The SSO integration in this case when integrated directly with the identity providers like OKTA®, ONELOGIN®, Microsoft Azure® AD and G Suite® will provide one set of credentials like username and password to access different applications. Additionally, this integration also provides insights on different applications used such as usage pattern of these applications, type of application, security standards, access rights etc. The integration may obtain this type of information with publicly available APIs. Additionally, the audit logs are also made available for obtaining different insights on system activities for compliance such as date and time of any activity, the owner of any activity, category of activity and so on. A typical SSO platform operates in below sequence:

a) A user visits the Service Provider's app or website such as an application like Slack® or zoom®.
b) The Service Provider sends the SSO platform, (Identity Provider) for example Microsoft azure® AD, a token containing user information, like their email address, to authenticate the user.
c) The Identity Provider first checks if the user has been authenticated; if so, it grants access to the Service Provider application and Skips to Step e).
d) If the user hasn't logged in, they'll be asked for the Identity Provider's credentials. This could be a username and password or a One Time Password (OTP).
e) After validating the credentials, the Identity Provider sends a token to the Service Provider to confirm authentication.
f) The user's browser sends the Service Provider this token.
g) The Service Provider validates the token based on the trust relationship set up during initial configuration and then User can access the Service Provider web/application.

Similarly, the application integration platform which is a direct means to access application insights obtains application usage information such as the amount of time spent, and type of features used by any given user of the application. Application integration basically allows to understand how software components/features and users interact. There are two major elements that enable the application integration operation, they are: Application Programming Interface (API), and activities and actions tracking. An API is a collection of functions and procedures that define how software components should interact with one another. They enable users to easily and quickly access the functionality of other software via well-defined data structures. Also, the activities and action tracking element in application integration platforms tracks different actions for example an in-app purchase has been made by any user then it results in a series of actions due to this activity initiated by the user. As a result, all the actions corresponding to any activity are tracked.

Also, the expense log integration platform enables the access to financial systems of an organization for example Quickbook® and Netsuke®. For instance, in certain situations when SSO integration is unable to provide/track information on financial transaction as some purchases might have been done on personal cards. The expense log integration module with help of APIs would be able to interact with data obtained from financial systems and would map the data with respective apps against which any payment is done.

In an alternate implementation, the various sources of application usage data like SSO integration, application integration and expense log integration can be given weights to indicate the importance or priority over other sources. For instance, weights can be provided on scale of 0-10, with 0 indicating lowest importance and 10 indicatives of highest importance. In. an example scenario, when the SSO integration data is not indicative of enough details the weights may be allocated on lower side and relatively higher weights are provided to the application integration data for obtaining the application usage pattern. These weights may be applied by the system automatically based on a historic confidence or credibility of the data sources. This weight applying technique may help the system operate efficiently as on certain occasions the processing power and time of the system would be saved by simply not considering the low weight sources.

In some embodiments, the integration platform may also include browser extension and desktop agent. The browser extensions or browser agents would be helpful in capturing the websites visited by the employees. The data captured by browser extensions may include URL, Title, Timestamp of opening and closing of the tab etc. Browser agents/extensions may be obtained for some of the popular web browsers such as Chrome, Firefox and Microsoft Edge. Similarly, the desktop agents would be able to capture information such as different apps installed on an employee's system, sign in and sign out details on the apps, device level information like product ID, Internet Protocol (IP) addresses and hardware information and apps running in the background. In this manner, all these integrations together may help in extracting insights about usage of multiple applications at step 102. All these integrations including SSO integration, application integration, expense log integration, browser extension and desktop agents provide a large volume and variety of data which may be in the form of structured, unstructured and semi structured data. The data received from the various integration sources help in extracting intelligent insights on different applications used in an organization. Additionally, these insights may help in taking some key business decisions that may help in running an organization in a more efficient manner.

In one embodiment, the one or more insights may include an application usage pattern and that can be determined through a combination of application integrations and Single Sign On (SSO) integrations. The usage pattern is one example, and may indicate the engagement level of a user on a particular application, such as sign-in and sign out time, the specific features being used by the user, frequency of use, etc. The one or more insights on application usage may also indicate the payments done against each application by the employee. Additionally, it may also provide information about license rights and any purchase of new license for particular applications. Furthermore, the system may provide usage pattern on licensed features for example whether the user is actively using the purchased licensed feature of an application or not. The usage pattern or user activity on applications may be obtained using publicly available APIs for specific applications. An API is an interface between a user/developer and a web application. This enables a seamless interaction between these two parties. Generally, API enables web application providers to open up their application function/features and data to external third parties to build further applications or solve existing problems by accessing these functionalities/insights via APIs. Similarly, the APIs are used to capture raw data of application usage pattern through integration platforms discussed above. The raw data would be in form of application activity logs, audit logs, expense logs and so on. These logs can be further enriched to derive intelligent insights for key business decisions.

At step 103, a request is received by the system to onboard a new employee. Subsequently, at step 104 the new employee's designation and department is identified. The new employee's designation and department may be automatically obtained by the system via a human resources information system (HRIS) used in the organization. Alternatively, this information may be obtained from employment letter offered to the new employee or respective department of the new employee may provide this information to the IT team of the organization either directly or via a HR management system. For example, an employee designation could be software development engineer (SDE) and corresponding department joined could be product engineering. Within the organization there may be multiple departments and these departments have employees with various designations based on the roles and responsibilities of the employees. Some more examples of designations could be Business Analyst, Consultant, HR Executive, IT analyst, Finance Advisor, COO, etc. Some examples for departments are Human Resources, Product Engineering, Information Technology (IT), Sales, Design, Finance etc.

Employees in an organization use multiple applications/software/tools. The system collects the data on the applications used by the employees in each department of the organization and stores it in a database. At step 105, a first list of applications is determined based on the departments of the organization. The first list of applications is determined corresponding to the department of the new employee to be onboarded. The list in one embodiment may be obtained by looking up the database and determining all the applications used by the employees corresponding to the department of the new employee to be onboarded. Next, at step 106 a second list of applications is determined that are being used by other employees in the organization with similar designation as that of new employee to be onboarded. For example, a new employee to be onboarded has joined Sales department and designation is Sales Executive then the first list of applications may include Salesforce® CRM, Freshworks® CRM, HubSpot® sales. This list of applications would be obtained by first referring to the list of applications that are being used by Sales department employees in the organization.

The second list of applications corresponding to the Sales Executive designation may include for example Zoom®, Freshworks® CRM, HubSpot® sales, Salesforce® CRM, Pipedrive®, ZenDesk®, Monday.com® etc. This list of applications would be obtained by referring to the list of applications that are being used by other Sales Executives in the organization.

Subsequently, at step 107 a union operation is performed between a first and second list of applications. in the above example, for a new employee joining the sales department with sales executive as the designation, the unique list of applications will include Salesforce® CRM, Freshworks® CRM, HubSpot® sales, Pipedrive®, Zoom®, ZenDesk®, Monday.com®. In more general example, a first list of applications corresponding to a department D1 may include applications App1, App2, App. . . AppN. Similarly, the second list of applications corresponding to a designation. D1 may include applications App1, App4, App7. . . AppN. A union operation between these two lists results in a unique list of applications App1, App2, App3, App4, App7, AppN.

At step 108, from the unique list of application a subset of applications is selected based on at least one of the one or more insights obtained from the application usage data obtained at step 102. For example, the one or more insights on application usage could be the number of users actively using each application, type of licenses used by the users, usage pattern of the applications, number of subscriptions taken for an application, the cost of each subscription, annual spending on each application, access rights for each application etc. In one example embodiment, the subset of applications can be selected based on the number of users using each application. For example, the applications that are used by maximum number of users from the particular department or with a specific designation are selected. In another example, the subset of applications can be selected based on the number of active users. In another embodiment, a sorting on list of applications may be performed such that an ordered list of applications is generated based on a particular insight. For example, the subset of applications can be sorted in the ascending order of their cost (subscription/purchase charges), such that the least expensive applications are listed at the top followed by the applications in an increasing order of cost.

At step 109, the selected set of applications are recommended by the system for onboarding of an employee. In one of the embodiments, an application with highest user activity would be recommended at the top in the set of recommended applications. This might be helpful in scenarios where some departments or designations or any combination thereof might not use the most installed applications, hence usage pattern/activity would be helpful in recommending only those applications that are actively being used by other employees in the same department or designation as the new employee. In another embodiment, the ordered list of applications maybe further sorted based on ascending application names if two or more applications have a same number of users.

The recommended set of applications are ordered/sorted to present most relevant application first. For example, the recommended set of applications are a top "n" number of applications in the list, where "n" is defined based on a total number of applications in the ordered list. In one example embodiment, the recommended set of applications would include top 10 applications out of a total of 50 applications. Additionally, once an application is added to an employee account, the list of application is refreshed with a new set of top 10 applications based on extracting insights from a fresh set of application data received from the various sources. Therefore, the recommended list can be a dynamic list which may be updated from time to time. Also, every time a new employee is onboarded, the application list is generated and recommended in real-time, so the recommendation is accurate and efficient.

In an alternate embodiment, the system may automatically choose the most relevant insights applicable to any specific designation and/or department of the employee. For example, if an employee joins a Legal department, then the system may automatically select the applications that requires specific security guidelines to be met to access the application. For instance, all the applications requiring VPN access would be recommended first to the employees joining Legal department of the organization. In another example if an employee joining as a contractor designation, then the system might not recommend the applications that are applicable or used by full time/regular employees in the organization. The above two scenarios are for exemplary purposes the system would automatically apply the appropriate insights as per the specific organization policies and requirement to ensure efficient onboarding of the employees.

For instance, an employee joined with a designation as 'Software Development Engineer' in the 'Product Engineering' department of ABC Corp. a software development company. Then the first list of applications based on designation 'Software Development Engineer' may include applications such as GitHub®, Proofhub®, Adobe Dreamweaver CC®, Slack® etc. The second list of application that is generated based on the 'Product Engineering' department of the employee would include list of applications used in this particular department. The second list of applications may include applications such as GitHub®, ®, Slack®, Bitbucket® etc.

Subsequently, a unique list of applications would be generated by performing a union operation on the above two generated lists. A set of applications is obtained from the unique list of applications based on one or more insights or parameters related to application usage. For instance, the parameter of the application usage may be the number of users using the applications. In this scenario, the set of applications would include GitHub®, Proofhub®, Adobe Dreamweaver CC®, Slack®, Zoom®, Bitbucket®. In an example scenario, corresponding to each application the number of users identified could be as follows, GitHub® (20 users), Proofhub® (12 users), Adobe Dreamweaver CC® (15 users), Slack® has (14 users), Zoom® (5 users), Bitbucket® (8 users). In some scenarios the list of applications may be filtered, for example, the list of applications with greater than 5 users would include GitHub® (20 users), Proofhub® (12 users), Adobe Dreamweaver CC® (15 users), Slack® has (14 users), Bitbucket® (8 users). In one embodiment this list of applications is further sorted based on an ascending or descending number of users. The sorted list of applications would be presented in this order GitHub®, Adobe Dreamweaver CC®, Slack®, Proofhub®, Bitbucket®.

Further, the recommended set of applications may be sorted/ordered based on the number of users using each application. In one embodiment, the number of users corresponding to each application maybe identified using the Single Sign On (SSO) integrations and/or through direct application integrations. An API maybe used to obtain application related information via different integrations. For example, corresponding to each application the number of users identified could be as follows, GitHub® (20 users), Proofhub® (12 users), Adobe Dreamweaver CC® (15 users), Slack® (14 users), Zoom® (5 users), Bitbucket® (8 users). The sorted list of applications would be presented in this order GitHub®, Adobe Dreamweaver CC®, Slack®, Proofhub®, Bitbucket® and Zoom®.

Figure 2:
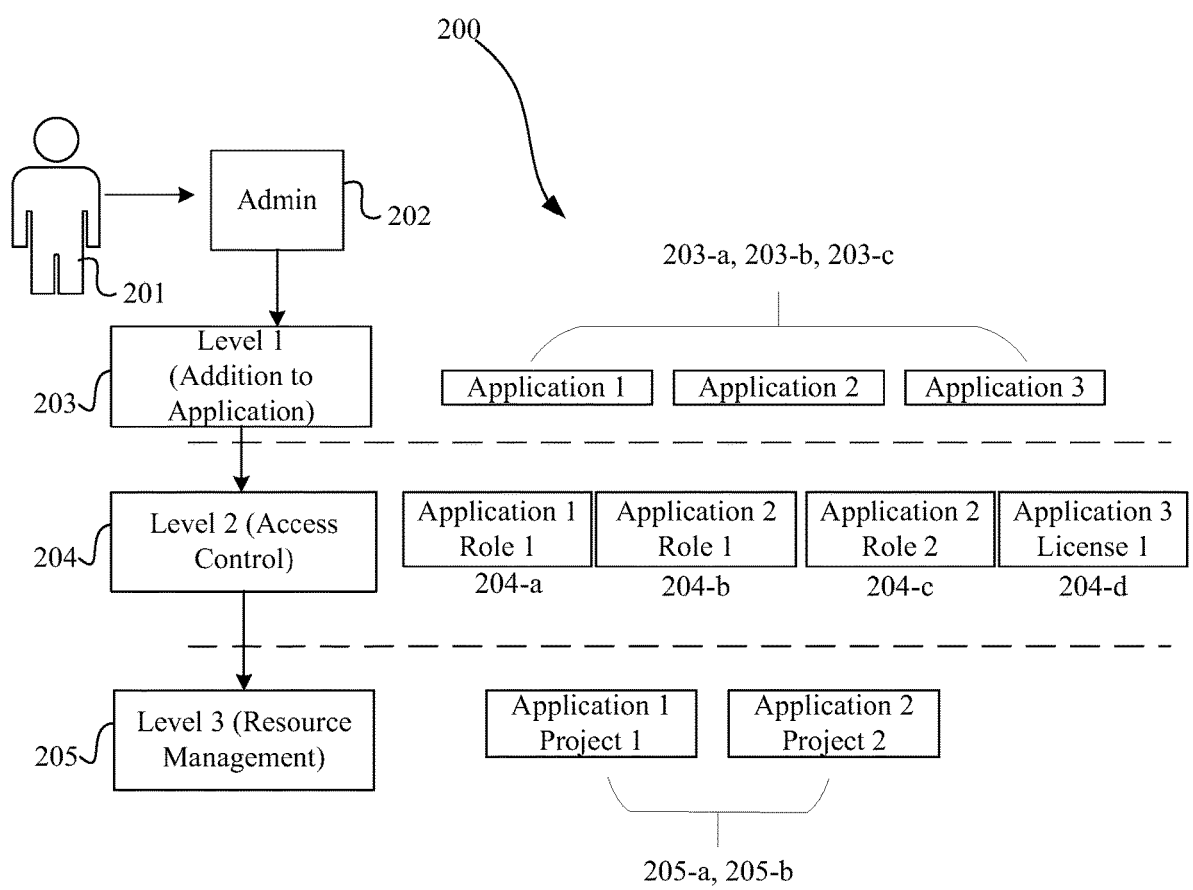
FIG. 2 illustrates an example implementation of a levelling framework with an embodiment of the present subject matter.

In one of the embodiments, each application from the recommended list of applications would be presented. by the system to an IT administrator's device/console. Further, corresponding to each recommended application there are multiple actions to be performed along with a levelling framework as shown in FIG. 2. A levelling framework is utilized for suggesting actions automatically corresponding to each application at different levels. As shown in FIG. 2, the levelling framework 200 includes multiple levels Level 1 203, Level 2 204 and Level 3 205 defining the actions that maybe taken at these different levels. For example, at Level 1 203, the recommended. applications may be added to an employee account by the system via an IT administrator console. For example, the recommended applications 203-*a*, 203-*b* and 203-*c* may be added to an employee account for performing day to day operations. Similarly at Level 2, 204, different access controls may be provided to an employee based on his/her role. At this access control level, the system may provide multiple options to access to specific licenses for different applications based on the role an employee. Additionally, at Level2, 204 the system may provide access to different groups or restricted areas to an employee. Subsequently at Level 3, 205 the resource management is done corresponding to each application such that the system may provide access to specific shared folders or projects or dashboards for performing day to day operations.

Figure 3:
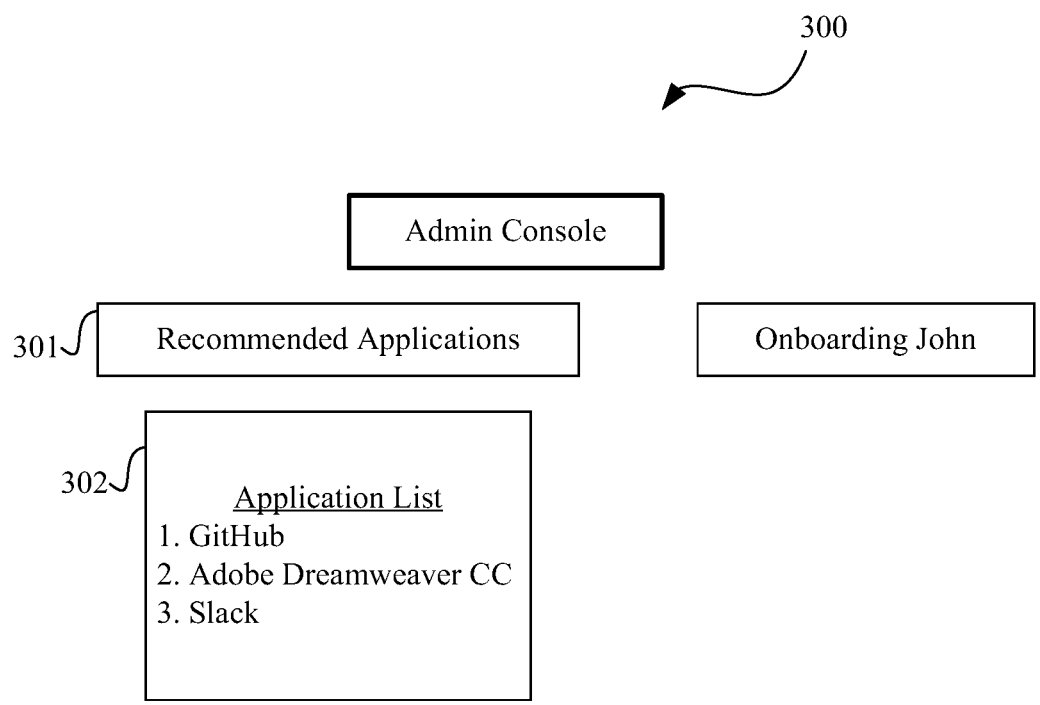
FIG. 3 illustrates an example implementation of an IT administrators console for managing onboarding workflows.
Figure 4:
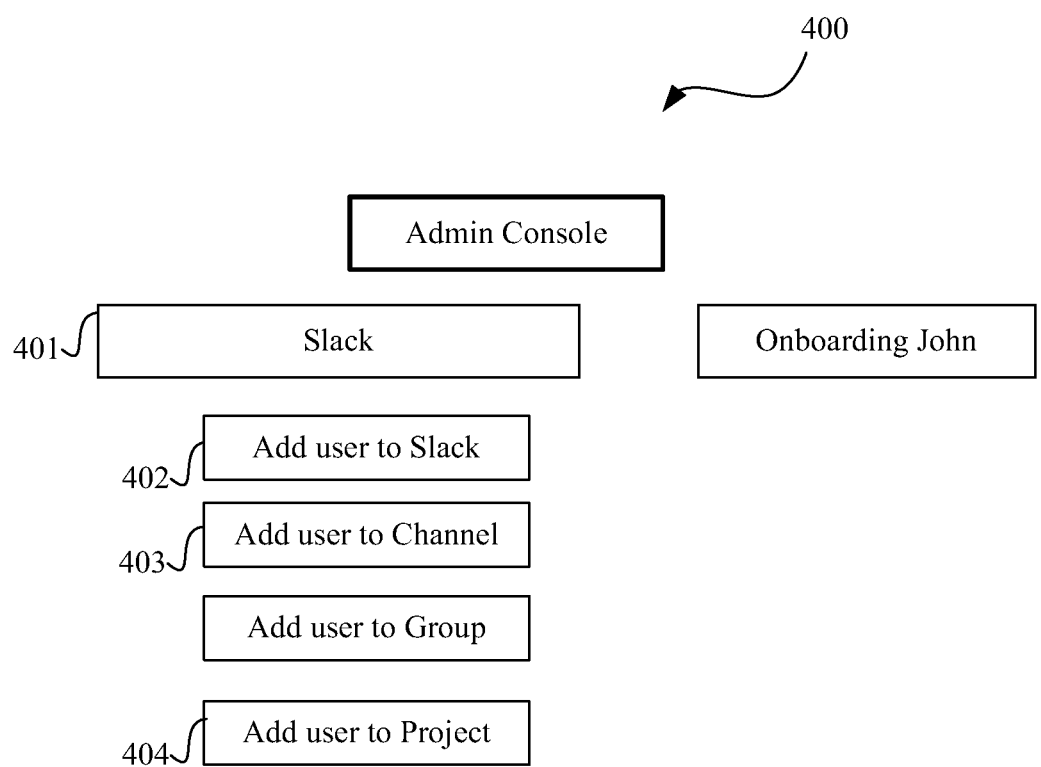
FIG. 4 illustrates an example implementation of an IT administrators console for one particular application in the workflow.

As shown in FIG. 3, the system handles the onboarding of a new employee via an IT Administrators console 300. The IT Administrators console 300 include recommended applications 301 in a list form 302. For example, an employee named John is onboarded and his list of recommended applications is generated by the system automatically based on the department and designation he is joining. Further, the system may automatically perform a set of actions for each application in the recommended list of applications. As shown in FIG. 4, system allows selection of applications for example an application 'Slack®' then corresponding to this application different actions are automatically populated. As shown in the FIG. 4, the Slack® application 401 is provided with different actions such as Add user to Slack® 402, Add user to Channel 403, Add user to Project 404.

Referring back to FIG. 2, the system generated actions on 'Slack®' application may be understood with respect to the levelling framework of the invention. Basically, system generated actions corresponding to Slack® application are defined at different levels. For example, as shown in FIG. 2, at Level 1, 203 an application maybe added to an employee account for further installation. In this case 'Slacks®' application is added to employee account and subsequently installed on employee's PC/system. Similarly at Level 2, 204 the IT administrator may provide access to the employee based on licenses, approvals, or roles corresponding to each application. At this level employee is added to a Slack® channel relevant to his role. Subsequently, at Level 3, 205 the IT administrator may orchestrate the resources for each application by providing access to specific shared folders, files, projects, or dashboards. For example, in this case access to specific group and/or projects resources of Slack® application corresponding to department and designation of the employee is provided by the system.

In an exemplary embodiment, a set of applications may be arranged in a sequence based on a priority of the one or more applications. Further, the priority may be dynamically computed based on the set of company rules, and application data using a machine learning algorithm. Subsequently the one or more actions may be scheduled for the applications following the priority sequence. An IT administrator or human participant may provide feedback for the sequence and schedule of one or more actions. The schedule for the one or more actions is modified based on the feedback. The priority sequence calculation is done based on a machine learning model. A machine learning model for instance in one embodiment takes two inputs, first a list of applications based on designation and department of the new employee. The second input of the machine learning model is application. usage data obtained via one or more integrations such as SSO integration, application integration, expense log integration, browser extension and desktop agent. The machine learning model outputs the priority sequence in which applications may be recommended to a new employee. Further, a human participant or an IT administrator may provide feedback for the sequence and schedule of one or more actions. The schedule for the one or more actions is continuously modified based on the feedback.

The machine learning model is trained based on the historical data obtained by system for recommending applications in a particular order. For example, as per the historical data of an organization if a new employee joined as 'sales manager' in a sales team, the following applications are recommended: Zoom® application, Salesforce® CRM and Slack® application. Additionally, based on historical application usage data it can also be identified on which applications the sales managers in the organization spend more time or actually usage is higher compared to other similar applications. Similarly, the historical data may also indicate some of the applications which are not at all used even after being installed on the system. In one example scenario if a Slack® application is not used by sales manager in the organization the system may not consider that for recommendations. The one or more insights on application usage are considered by the system for providing the recommendation. In an alternate embodiment, the application usage consideration may be obtained by combining one or more insights and the feedback or inputs obtained from the employees of the organization. This kind of inputs or feedback helps the system to learn from past user behaviours of application usage. Also, the company or organization policies may also impact the sequence of applications. For example, if the company policy doesn't recommend some applications those applications can be restricted from recommending to a new employee. In a non-limiting manner, just by a way of example some organizations wouldn't be allowing employees to use some dating applications on office hours or on office systems. These applications wouldn't be included in the recommended list. This historical application usage data for an organization may be utilized to train a machine learning model to provide priority sequence to the applications recommended by the system.

The machine learning model could be based on linear regression using Artificial Neural Networks (ANN). The input parameters for the linear regression may include list of applications and application usage metrics for example in the form of scores/numbers or any similar indicator of application usage activity for each application. The output expected from the model is to predict the score/priority for each application based on the input parameters and the training data. The training data may comprise historical application usage data corresponding to different designation and departments of an organization. The application usage data may comprise data obtained in form of logs with various parameters for example, log in and log out time on applications, different URLs accessed by the employee within the application, any purchases/expenses with respect to the application and other activities on applications. This entire historical application usage data is converted into training data as per the machine learning model requirements. As an example, and not by way of limitation the training data would indicate a score or rank may be on scale of 0-10 where it can assume multiple continuous values between 0-10 to indicate the priority or how important an application is for a particular designation and department employees. When a new employee joins the organization, then corresponding to the designation and department of the employee different recommended applications may be prioritized or scored on the scale of 0-10. In an example scenario, the applications that are below a particular score may be not recommended for installation. In one embodiment a deep learning algorithm would be applied on neural networks for required machine learning as shown. in FIG. 8.

Figure 5A:
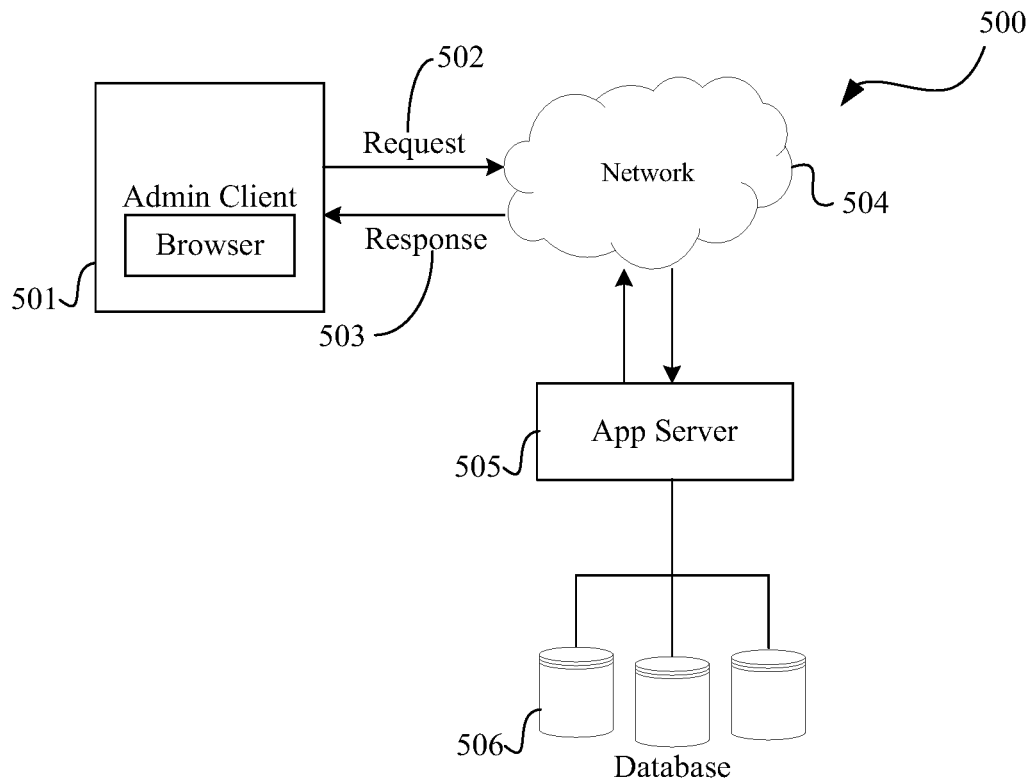
FIG. 5a and Figure 5b illustrates a system level implementation for unique recommendation for onboarding workflows, in accordance with an embodiment of the present subject matter.
Figure 5B:
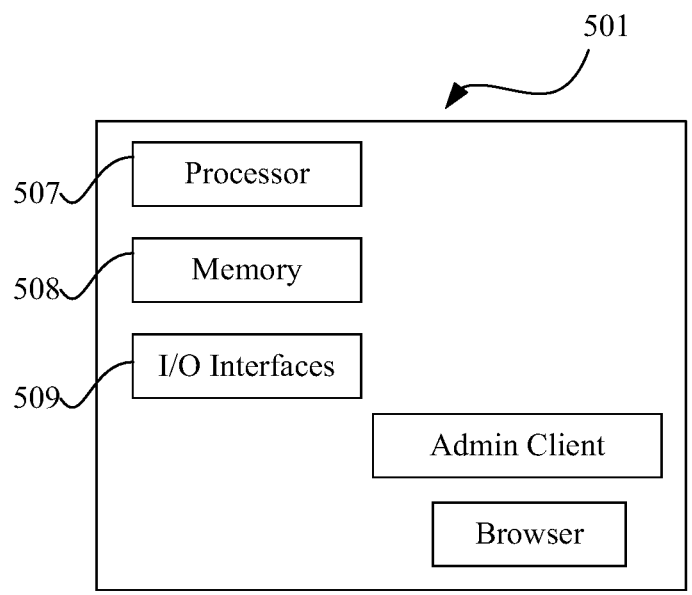

Referring now to FIG. 5, a network implementation of a system 500 for onboarding workflows based on a unique recommendation algorithm is disclosed. The system 500 enables different types of services/methods involved in onboarding workflows via an IT administrator client. For instance, the admin client 501 makes a request 502 for obtaining a designation and department of a new employee. The request may be sent through a network 504 to the database 506 via an App Server 505.

Although the present disclosure is explained considering that the system 500 is implemented in a client-server architecture it may be understood that the system 500 may be implemented using a variety of other computing systems, such as a laptop computer, a desktop computer, a notebook, a workstation, a virtual environment, a mainframe computer, a server, a network server, a cloud-based computing environment. It will be understood that the app server and database may be accessed by any of the above devices. In one implementation, the system 500 may comprise the cloud-based computing environment in which the admin may operate the SaaS applications. Examples of the admin device 501 may include, but are not limited to, a portable computer, a personal digital assistant, a handheld device, and a workstation. The admin client is communicatively coupled to the App server 505 through a network 504.

In one implementation, the network 504 may be a wireless network, a wired network, or a combination thereof. The network 504 maybe implemented as one of the different types of networks, such as intranet, local area network (LAN), wide area network (WAN), the intranet, and the like. The network 504 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 504 may include a variety of network devices, including routers, bridges, servers, computing devices, storage devices, and the like.

In one embodiment, the admin device 501 may include at least one processor, an input/output (I/O) interface, and a memory. The at least one processor 507 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 507 is configured to fetch and execute computer-readable instructions stored in the memory 508.

The I/O interface 509 may include a variety of software and hardware interfaces, for example, a web interface, a graphical user interface, and the like. The I/O interface 509 may allow the system 500 to interact with the App server 505 via network 504. Further, the I/O interface 509 may enable the system 500 to communicate with other computing devices, such as web servers and external data servers (not shown). The I/O interface 509 may facilitate multiple communications within a wide variety of networks and protocol types, including wired networks, for example, LAN, cable, etc., and wireless networks, such as WLAN, cellular, or satellite. The I/O interface 509 may include one or more ports for connecting a number of devices to one another or to another server.

The memory 508 may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, Solid. State Disks (SSD), optical disks, and magnetic tapes. The memory 509 may include routines, programs, objects, components, data structures, etc., which perform particular tasks or implement particular abstract data types. The memory 509 may include programs or coded instructions that supplement applications and functions of the system 500. In one embodiment, the memory 509, amongst other things, serves as a repository for storing data processed, received, and generated by one or more of the programs or the coded instructions.

The system 500, include a database 506 that may store information related to application usage. The application usage data is obtained through disparate sources as discussed in previous embodiments. The App Server 505 may implement logic/processes to obtain the required data as requested by the admin client 501. For example, the logic to extract insights from the application data obtained from different integrations such as single sign on (SSO) integration, application integration, expense log integration, browser extension and desktop agent is implemented by the App Server 505. Similarly, determining first and second list of applications followed by identifying set of applications and then ordering of applications based on usage patterns may be implemented via App Server 505.

Figure 6:
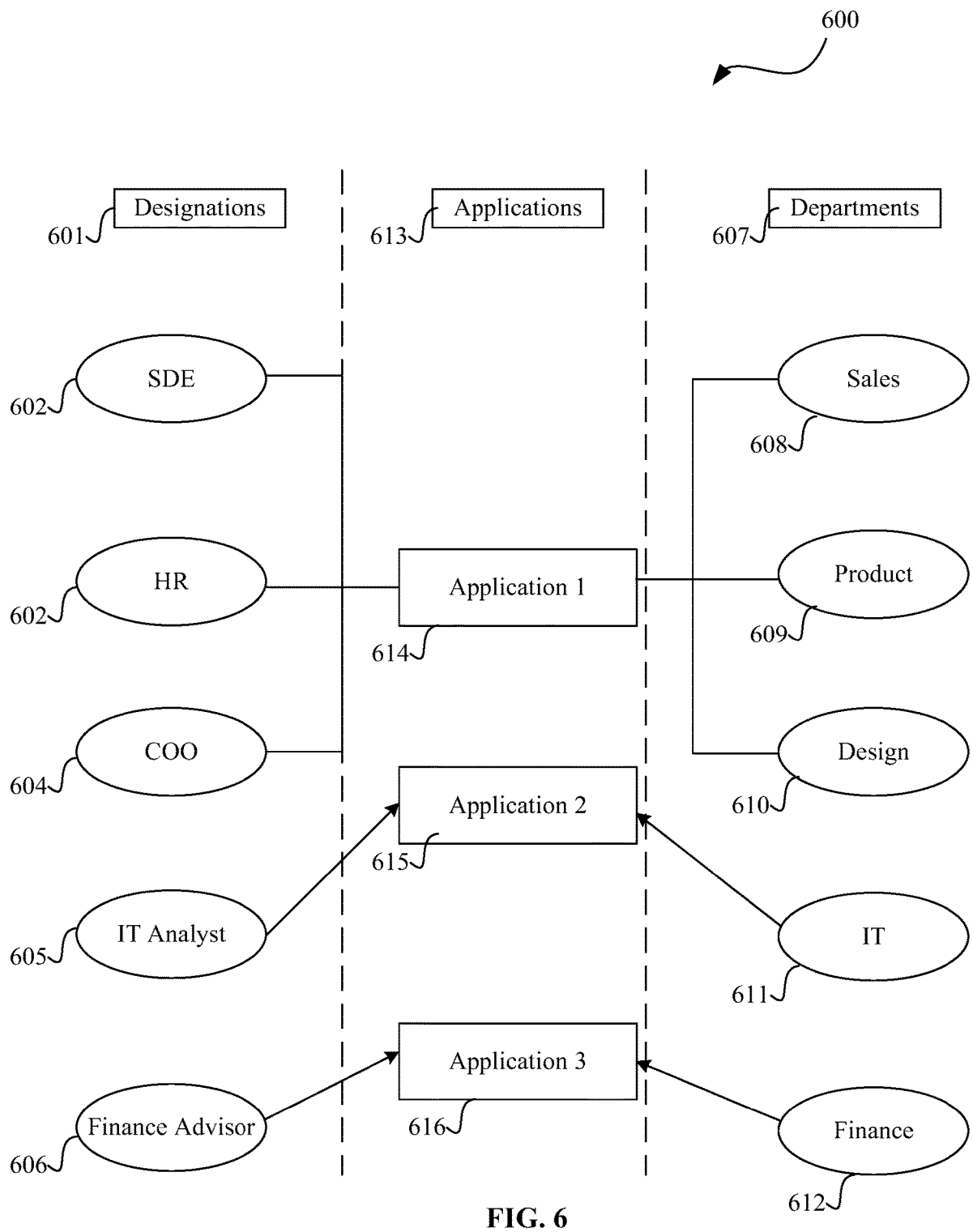
FIG. 6 illustrates a mapping and union operation for identifying unique list of applications.

Referring to FIG. 6 that describes mapping and union operation for identifying unique list of applications in one exemplary embodiment, A mapping of applications used in the organization with designation and departments is performed followed by a union operation. Firstly, a mapping of different Applications 613 with different Designations 601 in an organization is performed. For example, different Designations 601 in an organization may include SDE 602, FIR 603, COO 604, IT Analyst 605, and Finance Advisor 606. The mapping would result Applications 613 mapped to each designation, for example SDE 602, HR 603 and COO 604 uses 'Application 1' 614. Similarly, IT Analyst 605 designation uses 'Application 2', 615 and Financial Advisor designation 606 uses 'Application 3', 616.

Secondly, mapping of different Applications 613 used in the organization with different Departments 607 is performed. For example, different Departments 607 in an organization may include Sales 608, Product 609, Design 610, IT 611 and Finance 612. Again, different Applications 613 used in these departments 607 would be mapped with applications used in these departments 607, for example 'Application 1', 614 is used by Sales 608, Product 609, Design 610 departments. Similarly, 'Application 2', 615 is used by IT 611 department and 'Application 3', 616, is used by Finance department 612. Finally, a unique list of applications is obtained by performing union operation of first and second list of applications obtained by mapping operation of applications 613 with Designations 601 and Departments 607 in the organization. In this example scenario the unique list after union operation would include Application 1, 614, Application 2, 615 and Application 3 616.

In order to fetch a set of applications one or insights may be used as a criterion to shortlist a set of applications from the unique list of applications. In an exemplary embodiment, based on the number of users using the different applications, the system, would recommend an ordered list of applications to a new employee. For example, in the unique list mentioned above including Application 1, Application 2 and Application 3 if the number of users is 20, 11 and 32 respectively. Then an ordered list of application recommendation based on number of users would feature applications in following order Application 3, Application 1 and Application 2. In another exemplary embodiment, the applications can be recommended based on priority of the applications as per organization. requirement/policy. For example, if the Application 3 of above example is related to SSO service/authentication service to use an application then Application 3 would be recommended first followed by others in the priority order as per the organization policies. Also, in another example scenario the Applications can be fetched based on usage pattern of different users while using the application. For example, if the Application 1 is used for most of the time for day-to-day operation, then Application 1 will be fetched first followed by others in the order.

In another exemplary embodiment, the applications can be fetched based on application licensing tiers. For example, some applications may be used freely by the employees, or some application may require license/subscription to be purchased. In one scenario, the applications for which subscription needs to be purchased would be recommended first to the new employee followed by others. The one or more insights used to fetch the applications for recommendation are obtained through the application data obtained from various integrations such as sign on (SSO) integration, application integration, expense log integration, browser extension and desktop agent.

Referring back to FIG. 1, in an alternate embodiment a designation and department of an employee may also be obtained in an automated manner by applying machine learning techniques. For example, at step 101 of the method 100, the system may automatically read the offer letter/ employment letter provided to a new employee. The offer letter/employment letter may be a printed copy/hard copy and the IT admin machine/system may automatically read the letter by applying machine learning techniques and automatically identify the employee's designation and department as mentioned in the letter. In case multiple employees are to be onboarded, the automatic recognition of employee designation and department using offer letter/employment letter may also be processed in batches.

Figure 7:
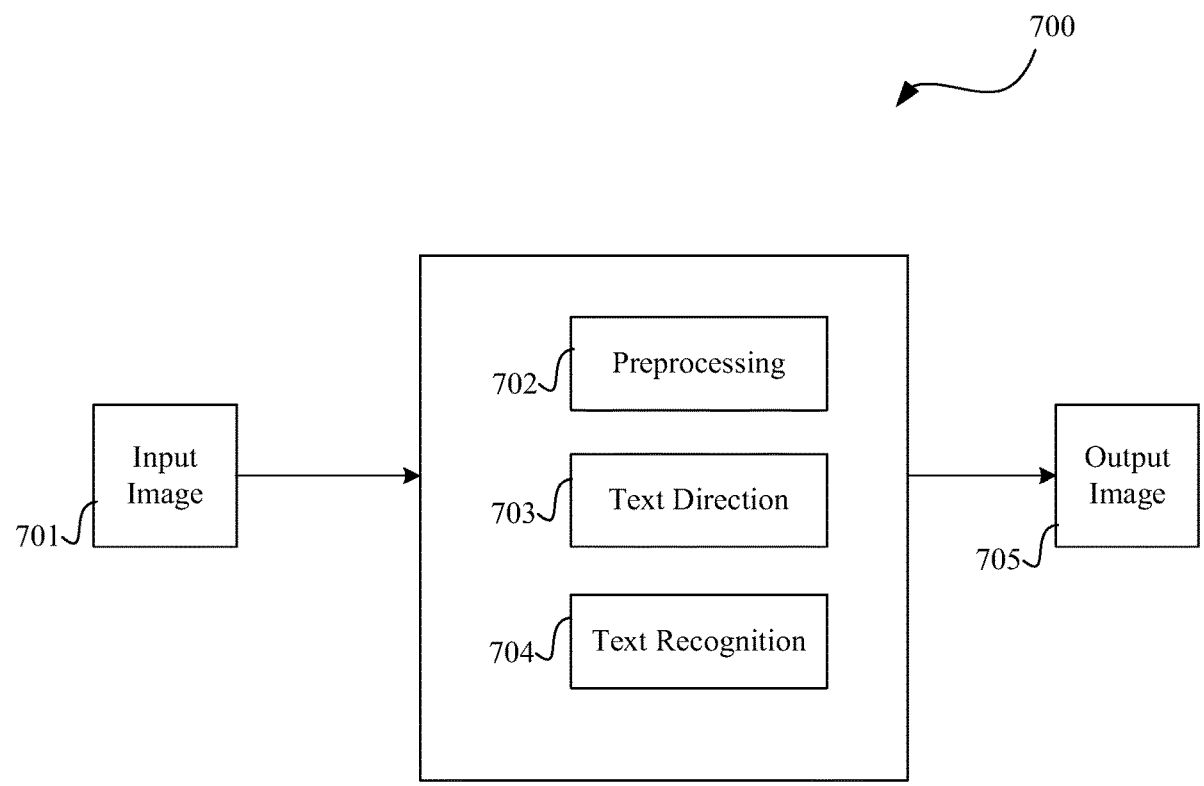
FIG. 7 illustrates steps for automatic text/character recognition from a scanned document/image.

The system may receive the offer letter/employment letter from the employee or through an IT administrator. In one embodiment the offer letter/employment letter could be a scanned document provided to the system for further processing. The scanned document may be read by an optical character recognition (OCR) software or tool that automatically identifies the designation and department of the employee from the offer letter/employment letter. In an exemplary embodiment the OCR system with a machine learning model maybe implemented as shown in FIG. 7. The machine learning model 700, takes the input image for example the scanned copy of the offer letter/employment letter at 701. Next the pre-processing of image takes place at 702. The pre-processing of the image involves text character simplification, detection of meaningful edges, and defining the text character outline. This is a well-known and generally used technique for an image recognition task. Next at 703, text detection takes place that maybe done by creating a bounding box around pieces of the text identified. Some of the well know techniques for text detection could be used like region-based detectors, sliding window technique etc. Next step in this process is the text recognition 704, which involves applying some machine learning techniques to detect the text identified in the bounding boxes at previous stage 703. A deep learning model such as Convolutional Neural Networks (CNN) and Recurrent Neural Network (RNN) maybe used in combination to perform the text detection.

Particularly, a Convolutional Neural Networks (CNN) maybe used to extract the features from the image and then Recurrent Neural Network (RNN) used to predict value of the text characters. CNNs help in detecting meaningful edges in an image and RNNs are used to find relationship between the characters.

For training the machine learning models a labelled dataset may be used which provides different designation and department details from already known offer letter/employment letter provided to the employees.

Figure 8:
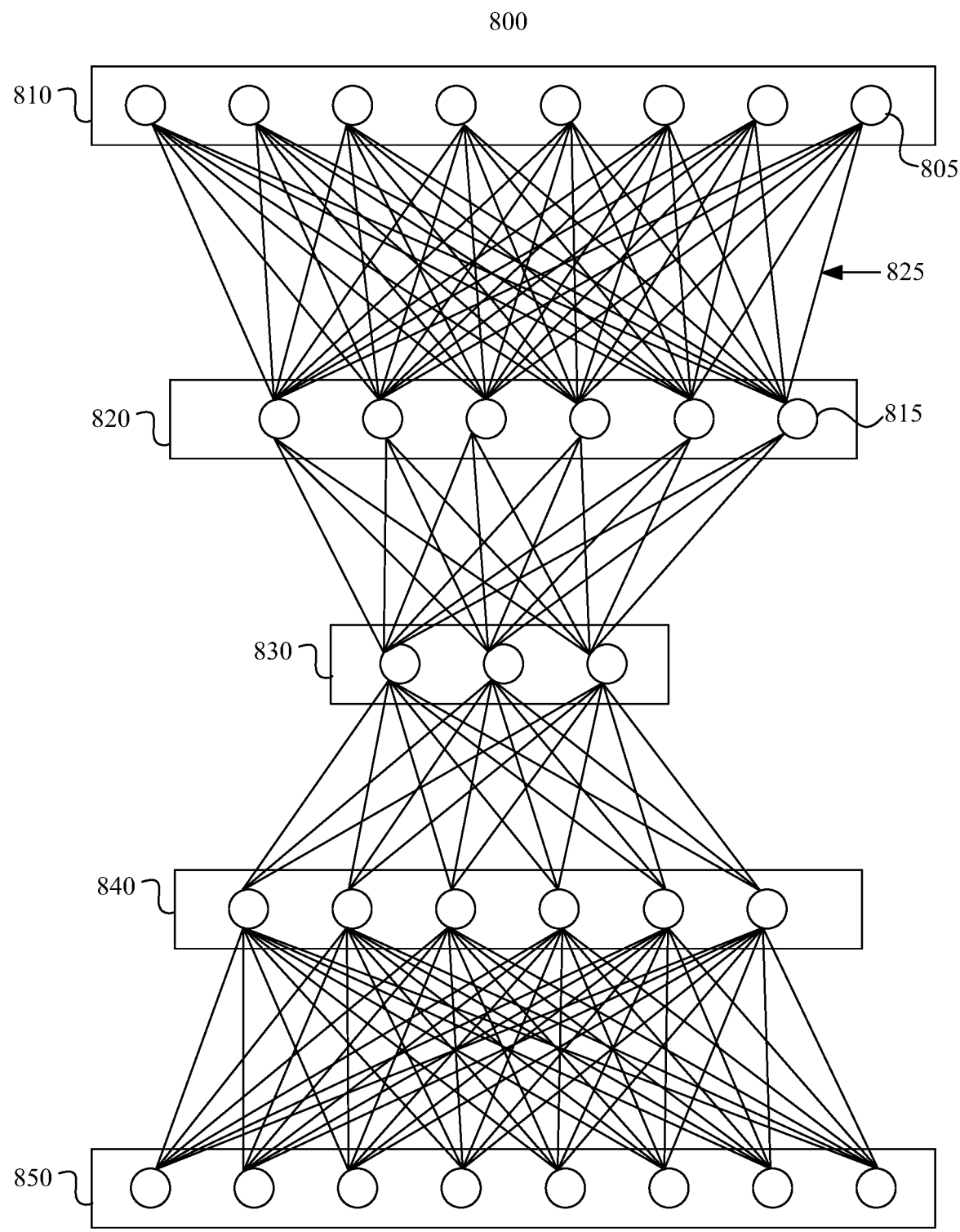
FIG. 8 illustrates an example artificial neural network, in accordance with an embodiment of the present subject matter.

Referring now to FIG. 8 that illustrates an example artificial neural network ("ANN") 800 of the deep learning algorithms. In an exemplary embodiment, an ANN may refer to a computational model comprising one or more nodes. Example ANN 800 may comprise an input layer 810, hidden layers 820, 830, 860, and an output layer 850. Each layer of the ANN 800 may comprise one or more nodes, such as a node 805 or a node 815. In particular embodiments, each node of an ANN may be connected to another node of the ANN. As an example, and not by way of limitation, each node of the input layer 810 may be connected to one of more nodes of the hidden layer 820. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 8 depicts a particular ANN with a particular number of layers, a particular number of nodes, and particular connections between nodes, this disclosure contemplates any suitable ANN with any suitable number of layers, any suitable number of nodes, and any suitable connections between nodes. As an example, and not by way of limitation, although FIG. 8 depicts a connection between each node of the input layer 810 and each node of the hidden layer 820, one or more nodes of the input layer 810 may not be connected to one or more nodes of the hidden layer 820.

In particular embodiments, an ANN may be a feedforward ANN (e.g., an ANN with no cycles or loops where communication between nodes flows in one direction beginning with the input layer and proceeding to successive layers). As an example, and not by way of limitation, the input to each node of the hidden layer 820 may comprise the output of one or more nodes of the input layer 810. As another example and not by way of limitation, the input to each node of the output layer 850 may comprise the output of one or more nodes of the hidden layer 860. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example, and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example, and not by way of limitation, an activation function may be an identity function, a binary step function, a logistic function, or any other suitable function.

In particular embodiments, the input of an activation function corresponding to a node may be weighted. Each node may generate output using a corresponding activation function based on weighted inputs. In particular embodiments, each. connection between nodes may be associated with a weight. As an example, and not by way of limitation, a connection 825 between the node 805 and the node 815 may have a weighting coefficient of 0.4, which may indicate that 0.4 multiplied by the output of the node 805 is used as an input to the node 815. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, the ANN may be trained using training data. As an example, and not by way of limitation, training data may comprise inputs to the ANN 800 and an expected output. As another example and not by way of limitation, training data may comprise vectors each representing a training object and an expected label for each training object. In particular embodiments, training the ANN may comprise modifying the weights associated with the connections between nodes of the ANN by optimizing an objective function. As an example, and not by way of limitation, a training method may be used (e.g., the conjugate gradient method, the gradient descent method, the stochastic gradient descent) to backpropagate the sum-of-squares error measured as a distance between each vector representing a training object (e.g., using a cost function that minimizes the sum-of-squares error). In particular embodiments, the ANN may be trained using a dropout technique. As an example, and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training the ANN in a particular manner, this disclosure contemplates training the ANN in any suitable manner.

Exemplary embodiments discussed above may provide certain advantages. Though not required to practice aspects of the disclosure, these advantages may include those provided by the following features.

Some embodiments of the system and the method would help in automating the various tasks while employee onboarding.

Some embodiments of the system and the method would be useful in making a structured onboarding procedure for the new employees. Additionally, the employee would be ready to work seamlessly from day one and not stuck with multiple approvals for getting right applications to be used for his/her day-to-day work.

Some embodiments of the system and the method would be helpful in seamless collaboration between multiple stakeholders involved in the onboarding process and also helps in keeping track of the entire process in real time.

Some embodiments of the system and the method of the subject matter where the onboarding solution is integrated with most used SaaS applications would be used to obtain the data about applications and may share with recruitment and payroll teams to ensure compliance obligations are met.

Although implementations for methods and system for onboarding workflows based on a unique recommendation algorithm have been described in language specific to structural features and/or methods, it is to be understood that the appended claims are not necessarily limited to the specific features or methods described. Rather, the specific features and methods are disclosed as examples of implementations for onboarding workflows based on a unique recommendation algorithm.

The invention claimed is:

1. A method for recommending applications for onboarding an employee via a SaaS management platform, the method comprising:
   receiving, by a processor, application data relating to multiple applications from disparate sources, wherein the disparate sources include at least one of a Single Sign On (SSO) integration, an application integration, an expense log integration, a browser extension, and a desktop agent;
   extracting, by the processor, one or more insights from the application data;
   receiving, by the processor, a request for onboarding a new employee in an organization;
   identifying, by the processor, a designation and a department of the new employee;
   determining, by the processor, a first list of applications used by other employees in the organization belonging to the department of the new employee;
   determining, by the processor, a second list of applications used by the other employees in the organization having a designation similar to the designation of the new employee;
   performing, by the processor, a union operation on the first and the second list of applications to retrieve a unique list of applications;
   selecting, by the processor, a set of applications from the unique list of applications based on at least one of the one or more insights; and
   recommending, by the processor, the set of applications for onboarding of the new employee, wherein the set of applications are ordered in a sequence based on a priority, and wherein the priority is dynamically computed using a machine learning algorithm.

2. The method as claimed in claim 1, further comprises automatically configuring one or more actions to be performed for each application in the set of applications based on a levelling framework.

3. The method of claim 2, wherein the levelling framework is configured to perform actions comprising:
   adding the set of applications to the new employee account;
   providing access to the new employee based on licenses, approvals, or roles corresponding to each application; and
   orchestrating resources for each application by providing access to specific shared folders, files, projects, or dashboards.

4. The method as claimed in claim 3, wherein the adding the set of applications include adding SSO service applications or email applications first, followed by other applications in the recommended set of applications.

5. The method as claimed in claim 2, wherein the one or more actions are performed via APIs available for specific applications.

6. The method as claimed in claim 1, wherein the received application data is transformed into a standardized form for extracting the one or more insights on application usage.

7. The method as claimed in claim 1, wherein the one or more insights include one or more of a number of employees using the application, license type, application subscription requirements, access rights, application level security, and usage pattern of application.

8. The method as claimed in claim 7, wherein the set of applications is ordered based on the usage pattern of applications.

9. The method as claimed in claim 8, wherein the usage pattern of applications is obtained through direct integration with the applications.

10. The method as claimed in claim 9, wherein the direct integration with the applications provides details of application usage including access level of an employee, license tiers, and access and audit logs.

11. The method as claimed in claim 1, wherein the recommended set of applications include information regarding a type of subscription required for each application.

12. The method as claimed in claim 1, wherein the one or more applications in the recommended set of applications is installed to the employee account by an admin or by an employee.

13. The method as claimed in claim 1, wherein the designation and department of the new employee is received automatically via an employee management platform.

14. The method as claimed in claim 1, wherein the designation and department of the new employee is automatically obtained from an offer letter released for the new employee.

15. The method as claimed in claim 1, wherein the application data is in the form of structured data, semistructured data, or unstructured data.

16. A system for recommending applications for onboarding of an employee via a SaaS management platform, the system comprising:
- a memory; and
- a processor coupled to the memory, wherein the processor is configured to execute one or more instructions stored in the memory to:
- receive application data relating to multiple applications from disparate sources, wherein the disparate sources include at least one of: a Single Sign (SSO), an application integration, an expense log integration, a browser extension, and a desktop agent;
- extract one or more insights from the application data;
- receive a request for onboarding a new employee in an organization;
- identify a designation and a department of the new employee;
- determine a first list of applications used by other employees in the organization belonging to the department of the new;
- determine a second list of applications used by other employees in the organization having a designation similar to the designation of the new employee;
- perform a union operation on the first and the second list of applications to retrieve a unique list of applications;
- select a set of applications from the unique list of applications based on at least one of the one or more insights; and
- recommend the set of applications for onboarding of the new employee, wherein the set of applications is ordered in a sequence based on a priority, wherein the priority is dynamically computed using a machine learning algorithm.

17. The system as claimed in claim 16, wherein the processor is further configured to automatically configure one or more actions to be performed for each application in the set of applications based on a levelling framework.

18. The system as claimed in claim 17, wherein the levelling framework is configured to perform actions comprising:
- adding the set of applications to the new employee account;
- providing access to the new employee based on licenses, approvals, or roles corresponding to each application; and
- orchestrating the resources for each application by providing access to specific shared folders, files, projects, or dashboards.

19. The system as claimed in claim 16, wherein the one or more insights include a number of employees using the application, license type used, application purchase, access rights and usage pattern of application.

20. A non-transitory computer program product having embodied thereon a computer program for recommending applications for onboarding of an employee via a SaaS management platform, the computer program product storing instructions for:
- receiving by a processor, application data relating to multiple applications from disparate sources, wherein the disparate sources include at least one of: Single Sign On (S SO) integration, an application integration, an expense log integration, a browser extension, and a desktop agent;
- extracting, by the processor, one or more insights from the application data;
- receiving, by the processor, a request for onboarding a new employee in an organization;
- identifying, by the processor, a designation and a department of the new employee;
- determining, by the processor, a first list of applications used by other employees in the organization belonging to the department of the new employee;
- determining, by the processor, a second list of applications used by other employees in the organization having a designation similar to the designation of the employee;
- performing, by the processor, a union operation on the first and the second list of applications to retrieve a unique list of applications;
- selecting, by the processor a set of applications from the unique list of applications based on usage pattern of applications;
- ordering, by the processor the set of applications based on the number of users of each application; and
- recommending, by the processor, the set of applications for onboarding of the employee, wherein the set of applications is ordered in a sequence based on a priority, wherein the priority is dynamically computed using a machine learning algorithm.

* * * * *